United States Patent [19]
Burmeister

[11] 4,456,409
[45] Jun. 26, 1984

[54] CUTTING TOOL
[75] Inventor: Werner Burmeister, Witten, Fed. Rep. of Germany
[73] Assignee: Fried. Krupp Gesellschaft mit beschränkter Haftung, Essen, Fed. Rep. of Germany
[21] Appl. No.: 475,766
[22] Filed: Mar. 16, 1983
[30] Foreign Application Priority Data
Mar. 27, 1982 [DE] Fed. Rep. of Germany ....... 3211460
[51] Int. Cl.³ .............................................. B26D 1/00
[52] U.S. Cl. ..................................... 407/104; 407/48; 407/112; 407/117
[58] Field of Search ............... 407/104, 105, 112, 117, 407/48, 103

[56] References Cited
U.S. PATENT DOCUMENTS
3,314,126  4/1967  Stier ................................... 407/105
3,543,363  12/1970  Diemond ........................... 407/117
3,844,008  10/1974  Sletten .............................. 407/117
3,908,255  9/1975  Faber ................................. 407/105

FOREIGN PATENT DOCUMENTS
2746958  4/1979  Fed. Rep. of Germany .
622200  3/1981  Switzerland .
1369096  10/1974  United Kingdom ................ 407/117

Primary Examiner—Leonidas Vlachos
Attorney, Agent, or Firm—Spencer & Frank

[57] ABSTRACT

A cutting tool comprises a tool holder body having a passage, a cutting insert seat mounted on the tool holder body adjacent the passage, and a cutting insert mounted on the cutting insert seat by a clamping device for tightening the cutting insert against the cutting insert seat. The clamping device includes a two-collar screw situated in the passage and is threadedly engaged in the tool holder body. The two-collar screw has two mutually spaced collars delimiting an annular space between themselves. The clamping device further includes a guide block situated in the passage of the tool holder body and extending into the annular space. The guide block cooperates with the collars to be displaced thereby parallel to the longitudinal axis of the two-collar screw upon turning of the screw relative to the tool holder body. The clamping device also has a tightening pin which passes through a central aperture of the cutting insert and through an aperture of the cutting insert seat and which is operatively connected to the guide block for pulling the cutting insert against the cutting insert seat upon tightening of the two-collar screw.

10 Claims, 6 Drawing Figures

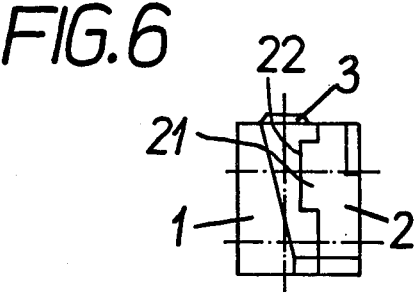
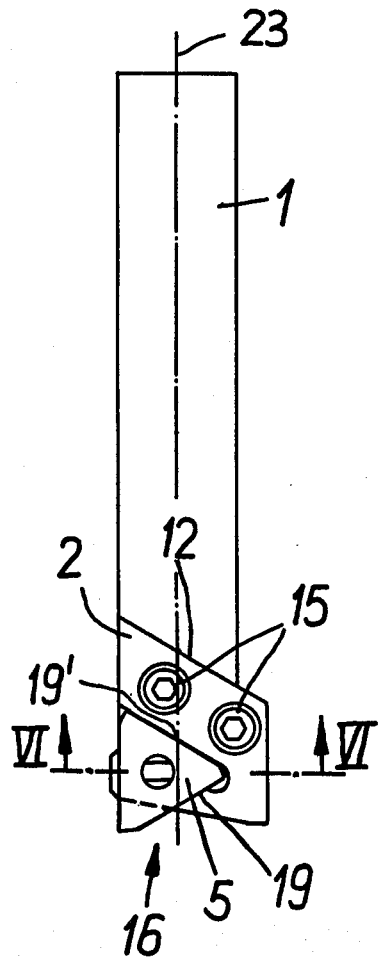
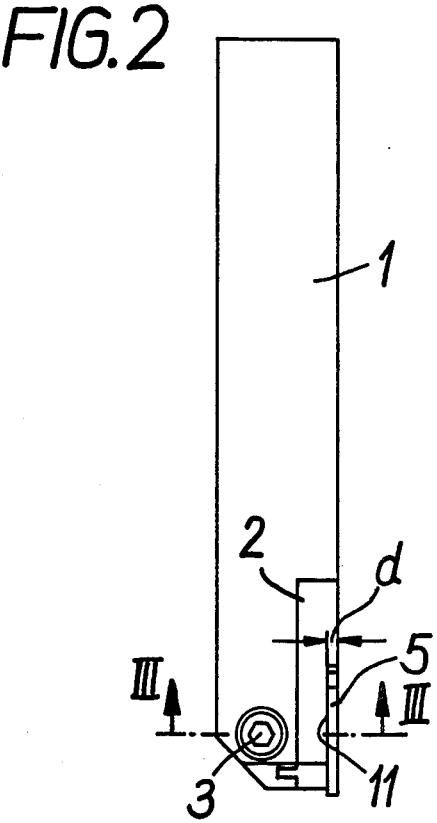

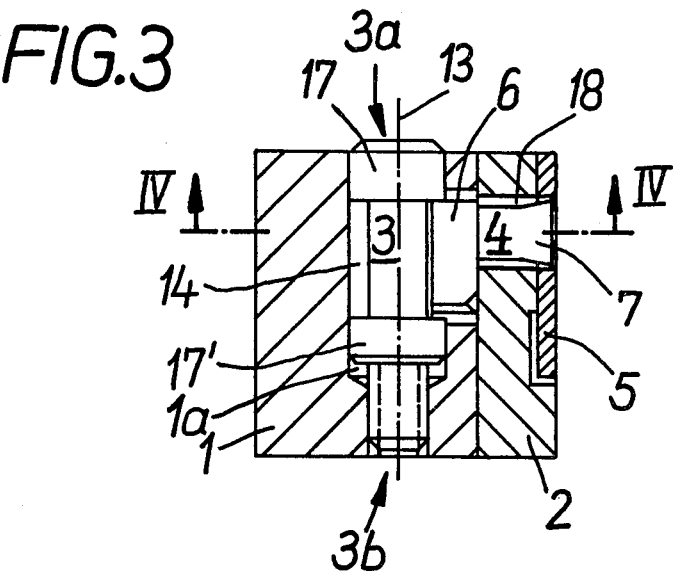
FIG. 3
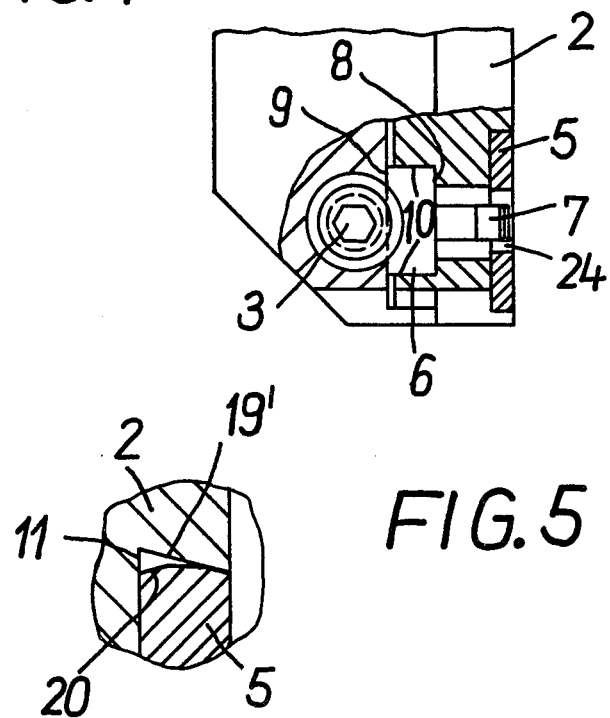
FIG. 4
FIG. 5

CUTTING TOOL

BACKGROUND OF THE INVENTION

This invention relates to a cutting tool which comprises a tool holder, a cutting insert seat and a cutting insert secured in the seat by means of a clamping mechanism. The cutting insert seat and the cutting insert are replaceable either as a unit or separately from one another.

In known cutting tools the cutting inserts are secured to a tool holder body. Thus, according to Swiss Pat. No. 622,200, for securing the cutting insert, a clamping body is provided which has a clamping claw and a hollow cylindrical guide member. The clamping body is arranged with a radial play in the tool holder body and further, the clamping body has, at its side oriented away from the clamping part of the clamping claw, an abutment face which is essentially parallel to the axis of a securing screw and perpendicular to the longitudinal axis of the tool holder body. Such a holding arrangement which permits the accommodation of reversible cutting inserts of only one particular size is particularly disadvantageous because of its enlarged (widening) configuration.

It has been further proposed to anchor the cutting insert together with a replaceable support element which corresponds to the size of the cutting insert, in the tool holder by means of a securing bolt which passes medially through the cutting insert and the support element. In such an arrangement too, the projecting edge of the head of the securing screw has impeded several operative processes or processes directed to the replacement of cutting inserts. Further, to perform a cutting insert replacement, the securing bolt has to be entirely screwed out of the tool holder and screwed back after replacement of the cutting insert.

Further, in German Offenlegungsschrift (Application Published Without Examination) No. 2,746,958 there are disclosed support elements for a reversible cutting insert which comprise a cylindrical part insertable in a radial direction in the tool body and forming an axial support for the reversible cutting insert as well as an arm which is a one-piece component with the cylindrical part and which extends therefrom essentially perpendicularly and forms a radial support for the cutting insert. Such a support element is also present in cutting tools of the earlier-described type and serves as a clamping element. Such an arrangement, however, requires narrow manufacturing tolerances between the tool shank and the support member in order to prevent the still frequent deformation of the reversible cutting insert in the insert seat. The cause of such a disadvantageous occurrence resides in the fact that because of the required central positioning of the clamping element with respect to the insert seat provided in the support piece and the oblique engagement face in the longitudinal direction, the geometry of the arrangement is overdefined. For operating the clamping element, a hexagonal sleeve wrench is needed which has to be introduced into a cylindrical opening provided for this purpose, which, because of its inconvenient location, is often soiled during service by scale dust and chip fragments.

SUMMARY OF THE INVENTION

It is an object of the invention to provide an improved cutting tool assembly of the above-outlined type which avoids the disadvantages of known arrangements and ensures a secure holding of the cutting insert and makes possible its easy clamping, removal or reversal without complex arrangements.

This object and others to become apparent as the specification progresses, are accomplished by the invention, according to which, briefly stated, the clamping mechanism comprises a two-collar screw as well as a tightening member formed of a guide block and a tightening pin. The guide block of the tightening member is situated between the two collars of the bolt and the tightening pin extends into a central hole of the cutting insert through a bore provided in the cutting insert seat.

The cutting tool according to the invention is advantageously so designed that it is void of any interfering structural projections and thus a plurality of cutting tools can be arranged close to one another for use in a cluster.

It is a further advantage of the invention that it offers the possibility to easily replace the cutting insert seat whereby in case of one and the same work tool holder body and the same clamping element different cutting insert or, as the case may be, different cutting insert seats may be used whereby different cutting widths may be achieved. The different cutting insert seats which may be used differ from one another only in the seating depth which varies corresponding to the thickness (cutting width) of the cutting insert.

The division of the clamping device into a tightening member and a tightening bolt has the advantage that an exact orientation of the cutting insert seat with respect to the position of the tightening bolt during tightening is not necessary. The cutting insert is forced into engagement with the cutting insert seat during tightening of the screw by means of the tightening pin which passes through the bore in the cutting insert seat and projects into the central hole of the cutting insert.

According to a further feature of the invention, the cutting insert seat has a feather key oriented towards the tool holder body and is received in a key way of the tool holder body and extends parallel to the longitudinal axis thereof. The feather key has an opening conforming to the guide block of the tightening piece for immobilizing, by means of engagement faces, the tightening piece in the direction of the longitudinal axis of the tool. The two-collar screw is guided by means of cylindrical collars in the tool holder body perpendicularly to the longitudinal axis thereof. The guide block is essentially of prismatic shape. The above-outlined characteristics determine unequivocally the position of the guide block of the tightening piece: the position of the guide block is determined in the direction of the longitudinal axis by virtue of the opening in the feather key and, in a direction perpendicular thereto, by virtue of the collars of the tensioning screw.

According to another feature of the invention, the cutting insert seat has an engagement face and lateral engagement faces for immobilizing the cutting insert. Preferably, the engagement faces are arranged perpendicularly or at an angle less than 90° to one another. Further, the cutting insert has a circumferential bevel conforming to the engagement faces of the insert seat. The bevel and the engagement faces cooperate in an optimal manner with one another during tightening or loosening of the cutting insert. A jamming of the tightening member is virtually not possible. It has been found advantageous to use reversible cutting inserts in which the circumferential edges are bevelled towards both possible engagement faces thereof.

The two-collar screw has at its head and at its opposite end (the threaded part) a hexagonal opening for receiving an Allen wrench. The tightening pin is preferably flattened in such a manner that it has flattened portions at both sides transversely to the longitudinal axis of the work tool holder.

BRIEF DESCRIPTION OF THE DRAWINGS

FIG. 1 is a side elevational view of a preferred embodiment of the invention.

FIG. 2 is a top plan view of the structure shown in FIG. 1.

FIG. 3 is a sectional view taken along line III—III of FIG. 2.

FIG. 4 is a sectional view taken along line IV—IV of FIG. 3.

FIG. 5 is an enlarged sectional detail of FIG. 4.

FIG. 6 is a sectional view taken along line VI—VI of FIG. 1.

DESCRIPTION OF THE PREFERRED EMBODIMENT

Turning now to FIGS. 1, 2 and 3, the cutting tool illustrated therein is a cutoff tool of generally rectangular configuration, having a tool holder body 1 of square cross section. At an end 16 of the tool holder body 1, in a recess of a side face thereof, there is mounted a cutting insert seat 2, secured to the tool holder body 1 by cylindrical bolts 15. Adjacent the seat 2 the tool holder body 1 threadedly supports a two-collar screw 3 passage 1a. The cutting insert seat 2 has a recessed seating face 11 adapted to receive a generally three, four or six-sided reversible cutting insert 5. The generally rectangular cutting insert seat 2 is flush with the tool holder body 1. To improve the absorption of cutting forces by the tool holder body 1, its recess receiving the cutting insert seat 2 has an oblique lateral abutment face 12 engaging a similarly configured oblique edge face of the cutting insert seat 2. The heads of the bolts 15 and the head 3a as well as the threaded end 3b of the two-collar screw 3a are recessed in the tool holder body 1 so that the entire tool is void of projecting parts. All bolt heads as well as the threaded end 3b have a hexagonal opening for receiving an appropriate turning tool, such as an Allen wrench.

The cutting insert seat 2 is replaceable so that without a removal of the work tool holder 1 there may be effected a replacement of the reversible cutting insert by exchanging the cutting insert seat 2. In the presently described embodiment, reversible cutting inserts of a thickness of 1.5 to 5.15 mm may be generally used.

While, by means of the engagement face 12 there is effected the positioning of the cutting insert seat 2 in the direction of the longitudinal axis 23 of the work tool holder 1, a clamping mechanism including a feather key and key way connection (and described below in detail in connection with FIGS. 3 and 4) provides for the positioning of the cutting plate 5, respectively of the cutting insert seat 2.

Turning now particularly to FIGS. 3 and 4, for the positioning and tightening of the reversible cutting insert 5 there is provided the two-collar screw 3 and a tightening member 4 formed of a guide block 6 and a tightening pin 7. The two collars 17 and 17' of the two-collar screw 3 together delimit an annular space 14 situated generally at a height level where engagement between seat 2 and cutting insert 5 occurs. As a result, the axially relatively wide annular groove 14 defined between the upper collar 17 and the lower collar 17' accommodates the guide block 6 of the tightening member 4 and thus the guide block 6 is immobilized in the axial direction 13 of the two-collar screw 3 by means of the upper and lower collars 17 and 17'.

The structure of the feather key 21 which projects into a key way 22 provided in the tool holder body 1 and which is parallel to the longitudinal axis 23 of the tool holder body 1 is shown in FIG. 6. The feather key 21 which forms part of the cutting insert seat 2 has, at the height level of the groove 14, a recess with engagement faces 10, so that the guide block 6 is immobilized in the direction of the longitudinal axis 23 by means of the engagement faces 10 and, perpendicularly thereto, by means of the upper and lower collars 17 and 17'. Engagement faces 8 and 9 contribute to the guiding and supporting of the tightening member 4. The tightening pin 7 of the tightening member 4 is oriented transversely to the longitudinal axis 23 and passes through a bore 18 provided in the cutting insert seat 2 and through a central hole 24 of the reversible cutting insert 5.

FIG. 5 illustrates the positioning of the cutting insert 5 in the cutting insert seat 2, particularly at the intersecting engagement faces 19 and 19' (FIG. 1). The engagement faces 19 or 19' are bevelled in the direction of the engagement face 11 such that a motion of the cutting insert 5, which has likewise bevelled edges 20, in the direction of the engagement faces 19, 19', leads to the cutting 5 being pressed more against its seat, that is, against the engagement face 11. The bevelled engagement faces 19 and 19' and the bevelled edges 20 thus effect a precise positioning of the cutting insert 5.

For assembling the above-described cutting tool, the tightening member 4 is placed in the cutting insert seat 2 so that the guide block 6 engages the support faces 10 of the feather key 21 in its recess. Thereafter, the cutting insert seat 2 is inserted into the tool holder body 1 while orienting the guide block 6 such that it assumes its position in the middle of the groove 14 between the two collars 17 and 17' of the two-collar screw 3. Thereafter, the selected cutting insert 5, having a thickness d (FIG. 2) is inserted onto the cutting insert seat 2 so that the tightening pin 7 of the tightening member 4 projects through the bore 18 of the cutting insert seat 2 into the central hole 24 of the cutting insert 5. A tightening of the two-collar screw 3 results in a shifting of the guide block 6 in the direction of the longitudinal axis 13 of the two-collar screw 3, that is, transversely to the direction of the longitudinal axis 23 of the tool holder body 1, whereby the likewise shifted reversible cutting insert 5 abuts firmly the engagement faces 19 and 19'. A tightening of the two-collar screw 3 effects the closest possible approach of the edges 20 towards the engagement faces 19 and 19' of the cutting insert seat 2, whereby the cutting insert 5 is simultaneously pressed into the insert seat 2, that is, against the engagement face 11 thereof. A removal or, as the case may be, a replacement of the cutting insert 5 is effected in the reverse order and is initiated by loosening the two-collar screw 3.

Even though the number of turns of the two-collar screw 3, necessary for removing the cutting insert 5 depends from the thread pitch in the screw 3, it is no longer necessary to remove or screw out the securing means, that is, the clamping device entirely for effecting a replacement of the cutting insert 5. In case of the embodiment described, only one ½-turn of the two-collar screw 3 is necessary to effect release. Upon replacement of the cutting insert seat 2 together with the cutting insert 5, the two-collar screw 3 and the tightening member 4 may remain in the tool holder body 1. The division of the clamping device into a two-collar screw 3 and a tightening member 4 has the advantage that a precise positioning of the cutting insert seat 2 with respect to the two-collar screw 3 situated in the tool holder body 1 is not necessary. Since the tightening member 4 is fixed (immobilized) in the cutting insert seat 2 by means of the abutment faces 10 and is guided between the collars 17 and 17', a precise positioning of the tightening pin 7 with respect to the cutting insert center is ensured. Further, upon leverage effect during the tightening step a jamming of the cutting insert 5 is prevented by a dimensioned coordination between the cutting insert seat 2 and the tightening member 4.

Thus, it will be apparent from the above discussion that a cutting tool is provided which is easy to handle, in which the cutting insert may be replaced rapidly and in which, furthermore, a precise alignment of the cutting insert is ensured upon insertion and tightening.

It will be understood that the above description of the present invention is susceptible to various modifications, changes and adaptations, and the same are intended to be comprehended within the meaning and range of equivalents of the appended claims.

What is claimed is:

1. A cutting tool comprising
   (a) a tool holder body having a passage and a longitudinal axis;
   (b) a cutting insert seat arranged on said tool holder body adjacent said passage and having an aperture;
   (c) fastening means for releasably mounting said cutting insert seat to said tool holder body;
   (d) a cutting insert arranged on said cutting insert seat and having a central aperture; and
   (e) clamping means for tightening said cutting insert against said cutting insert seat, said clamping means including
      (1) a two-collar screw situated in said passage and threadedly engaged in said tool holder body; said two-collar screw having first and second mutually spaced collars delimiting an annular space between themselves; said two-collar screw having a longitudinal axis;
      (2) a guide block situated in said passage and extending into said annular space; said guide block being in a cooperating relationship with said collars to be displaced thereby parallel to said longitudinal axis of said two-collar screw upon turning thereof relative to said tool holder body; and
      (3) a tightening pin passing through said central aperture of said cutting insert and through said aperture of said cutting insert seat and being operatively connected to said guide block for pulling said cutting insert against said cutting insert seat upon tightening of said two-collar screw.

2. A cutting tool as defined in claim 1, further comprising a feather key forming part of said cutting insert seat and oriented towards said tool holder body; and a key way provided in said tool holder body and receiving said feather key; said feather key and said key way extending parallel to said longitudinal axis of said tool holder body; said feather key having a recess defined by spaced opposite engagement faces; said guide block extending into said recess of said feather key and contacting said opposite engagement faces for immobilizing said guide block and said tightening pin with respect to a direction parallel to said longitudinal axis of said tool holder body.

3. A cutting tool as defined in claim 1, wherein said collars are cylindrical and wherein said two-collar screw has a path of displacement parallel to said longitudinal axis of said two-collar screw and perpendicular to said longitudinal axis of said tool holder body.

4. A cutting tool as defined in claim 1, wherein said guide block has a substantially prismatic shape.

5. A cutting tool as defined in claim 1, wherein said cutting insert seat has a recess accommodating said cutting insert; said recess being defined by a bottom engagement face and lateral engagement faces; said bottom and lateral engagement faces contacting said cutting insert for immobilizing said cutting insert relative to said cutting insert seat.

6. A cutting tool as defined in claim 5, wherein said lateral engagement faces form an angle of 90° at the most.

7. A cutting tool as defined in claim 5, wherein said lateral engagement faces of said cutting insert seat are bevelled; and further wherein said cutting insert has bevelled boundary edges conforming to the bevelled lateral engagement faces of said cutting insert seat.

8. A cutting tool as defined in claim 7, wherein said cutting insert is a reversible cutting insert and further wherein said boundary edges are bevelled bidirectionally for conforming to the bevelled lateral engagement faces of said cutting insert seat in either seated position of said cutting insert.

9. A cutting tool as defined in claim 1, wherein said two-collar screw has a threaded portion having an end face opposite said first collar; said end face having a hexagonal recess for receiving a turning tool.

10. A cutting tool as defined in claim 1, wherein said tightening pin is bilaterally flattened in a direction perpendicular to the longitudinal axis of said tool holder body.

* * * * *